April 29, 1947.   D. G. ANDERSON   2,419,622
LATHE SPINDLE DRIVE
Filed June 18, 1943

INVENTOR
Douglas G. Anderson
BY
Parker Prochnow & Farmer
ATTORNEYS

Patented Apr. 29, 1947

2,419,622

UNITED STATES PATENT OFFICE 2,419,622

LATHE SPINDLE DRIVE

Douglas G. Anderson, Elmira, N. Y., assignor to Hardinge Brothers, Inc., Elmira, N. Y.

Application June 18, 1943, Serial No. 491,367

2 Claims. (Cl. 82—28)

This invention relates to lathes and more particularly to improvements in the arrangement of the spindle drive means of high speed or precision lathes, such as are used for work which requires extreme precision or accuracy in the dimensions and shape of the finished work.

It is usual in lathes for the live spindle to be rotatably mounted or journalled in two or more bearings in the head stock, which are spaced a substantial distance from each other lengthwise of the spindle in order to ensure requisite stability and true rotary motion of the spindle without deflection or deviation from its axis of rotation, and it is also common practice to secure the belt pulley or wheel on an overhanging part of the spindle, located outwardly beyond such spaced spindle bearings. It is, however, desirable in many lathe operations to have the spindle free of its drive mechanism, so that the spindle can readily turn without the friction resulting from the turning of the motor and the drive belts. For example, it is desirable when centering work on a face plate secured to the spindle, to have the spindle rotate freely with the minimum of friction, so that any eccentricity of the work will result in a turning or oscillation of the spindle, which will enable the operator to better locate the work on the face plate.

It has also been found that if the pulley is secured directly on an overhanging part of the spindle, the pull of the belt or belts on the pulley, transmitted to the spindle causes enough deflection, distortion or bending of the spindle to prevent realization of the requisite precision of dimensions or shape of the finished work, which is often required to be finished to within as little as one ten-thousandths of an inch of the specified dimension.

A primary object of my invention is to provide an improved arrangement or construction of the spindle drive mechanism of a lathe so as to avoid the objection of distorting the spindle bearing and also enable the spindle to be readily disconnected from its drive mechanism.

Other objects of the invention are to provide a spindle drive means for lathes which is of improved novel arrangement or construction; in which the spindle driving pulley or wheel is rotatably mounted, independently of the spindle and its bearings, on a separate bearing on the headstock, so that any radial or side thrust or pressure of the drive belt or means on the spindle wheel or pulley will be borne by said bearing for this wheel or pulley, and the spindle will be relieved of such thrust or pressure; in which the spindle pulley or wheel is rotatably mounted, independently of the spindle, on a fixed bearing on the headstock, and coupling means are provided whereby the spindle can be coupled to said pulley or wheel to rotate therewith, or uncoupled therefrom to permit independent rotation of the spindle as for instance for the purpose of facilitating the centering or balancing of the work on the spindle chuck or face plate; in which the spindle is provided with a hand wheel at its outer end portion for manually turning it, which hand wheel is provided with the coupling means or elements for coupling the spindle to or uncoupling it from its drive pulley or wheel; in which a spring actuated detent or member is provided that normally urges said coupling element into coupling engagement with the spindle pulley or wheel, and also serves to releasably retain the coupling element out of coupling position when it has been moved to such position.

Further objects and advantages of the invention will appear from the following specification of the preferred embodiment of the invention, shown in the accompanying drawing, and the novel features of the invention are set forth in the appended claims.

Figure 1:
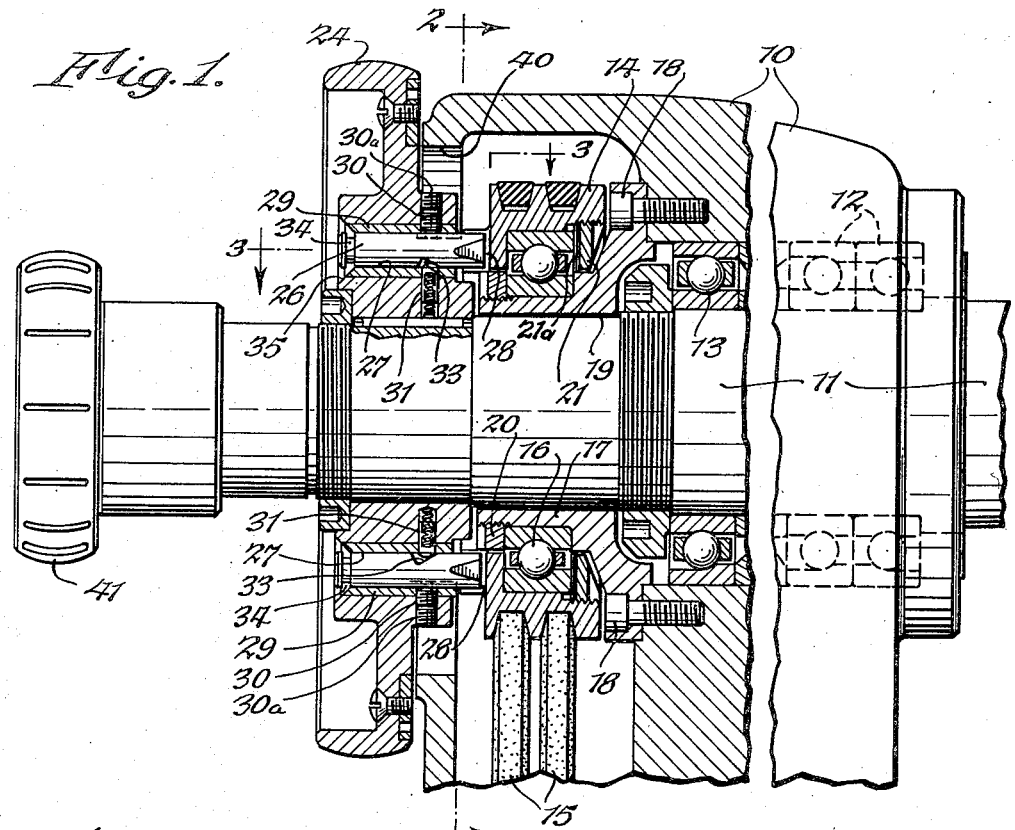
Fig. 1 is a broken front elevation, partly in longitudinal, vertical section, of the headstock and associated parts of a lathe embodying my invention.
Figure 2:
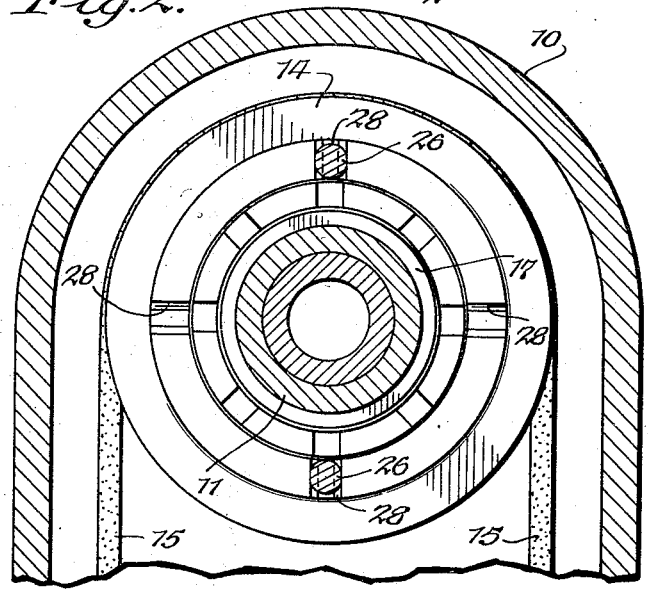
Fig. 2 is a transverse sectional elevation thereof, on line 2—2, Fig. 1.
Figure 3:
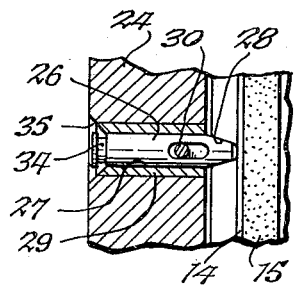
Fig. 3 is a fragmentary sectional plan thereof, on line 3—3, Fig. 1.

Referring to the drawing, 10 represents a lathe headstock of any usual or suitable construction, and 11 the usual live lathe spindle which is journalled or mounted to rotate in suitable bearings in the headstock, said bearings in the construction illustrated, comprising one or more ball bearings 12 in the inner end portion of the headstock and an outer ball bearing 13 which is spaced away from the inner bearings 12 toward the outer end of the headstock a sufficient distance to ensure the requisite stable rotary mounting for the spindle. In Fig. 1, the headstock and contained parts are broken away between the inner and outer bearings 12 and 13 to reduce the length of this figure, but it will be understood that the inner and outer bearings for the spindle are, as usual, spaced a substantial distance apart, with the outer bearing 13 more or less adjacent the outer end (the left-hand end, in Fig. 1) of the headstock. The spindle bearings may be of any usual or suitable construction and arrangement.

14 represents the wheel or pulley of the spindle drive mechanism which is connected with the spindle to drive the same and which may be driven as by the usual belts 15, driven by any suitable change speed drive gearing (not shown). This spindle pulley or wheel 14 is not mounted on or directly secured to the spindle as has been done heretofore, but, on the contrary, is rotatably mounted by means of a suitable bearing 16 on a bearing bracket or support 17 which, preferably, as shown, is of annular form, surrounding the spindle outwardly beyond the outer spindle bearing 13, and is fixedly secured, as by screws 18, on the headstock 10. The spindle extends freely through the central opening 19 of the bearing bracket 17, a clearance being provided between the bearing bracket and the spindle, as indicated to an exaggerated extent in Fig. 1. Thus, the spindle pulley or wheel 14 is mounted on a bearing 16, which may be a ball bearing, or bearing of any other suitable construction, on a support which is a fixed part of the headstock, and therefore, the wheel is mounted and supported wholly independently of the lathe spindle and its bearings 12 and 13, so that any radial or side thrust resulting from the pull of the driving belts or means 15 on the pulley or wheel 14 will be borne by or transmitted to its bearing support which constitutes a fixed part of the headstock, and the spindle and its bearings will be wholly relieved of such thrust or pressure. Therefore, the operation of the spindle cannot be affected by any radial or side pressure on the pulley or wheel 14 incident to the driving thereof. As shown, the inner race ring of the ball bearing 16 for the spindle pulley 14 is secured on a cylindrical portion of the bearing bracket 17, between a shoulder on the bracket at the inner end of the race ring and a nut 20 screwed on the threaded outer end of said cylindrical portion of the bracket. The outer race ring of the bearing is pressed into a cylindrical central cavity in the wheel 14. A ring or nut 21 is screwed into the internally threaded outer end of the cavity and serves to clamp the outer ring or race of the bearing 16 securely in place. This ring or nut 21 also serves, through the medium of washers or packing means, clamped between the nut and the outer bearing ring, as shown at 21a, to prevent the escape of lubricant from the bearing cavity by centrifugal force.

The spindle 11 is preferably connected with its driving wheel or pulley 14 by suitable coupling means adapted to cause the spindle to turn with the pulley, or to uncouple the spindle from the pulley so that the spindle may turn or be rotatively adjusted independently of or relatively to the pulley, and without turning its driving motor, and with the minimum of friction. This coupling means, as shown in the drawings, is constructed as follows: A hand wheel 24, as usual is suitably keyed or removably fixed on the outer end portion of the spindle to turn therewith adjacent the outer end of the pulley 14, and this wheel carries coupling elements 26, preferably in the form of drive pins mounted to slide lengthwise inwardly and outwardly in guide holes 27 extending lengthwise through the hand wheel. Two drive pins 26 are shown, but any desired number may be employed and the drive pins may be of any desired form. The inner end of each drive pin is adapted, when the pin is moved inwardly to engage in a notch or recess 28, of which there may be two or more, four being shown, in the outer end of the pulley 14 to lock the spindle pulley 14 to the hand wheel to turn therewith. The drive pins shown are circular in cross section, but pins of any other cross-sectional form may be employed. The inner end of each drive pin and each notch 28 is preferably tapered or beveled, as indicated, to enable the pins to readily enter and fit snugly in the notches to reduce to the minimum lost motion or play between the hand wheel and spindle pulley when they are coupled together. Any lost motion or play in the coupling between the drive pulley and the spindle would during the operation of the lathe result in "chatter," which in turn is noticeable in the cuts made by the lathe, thus resulting in imperfect work. As shown, the guide hole 27 for each drive pin is formed in a cylindrical bushing 29 which is fixed in a cylindrical hole extending through the hand wheel. This adapts the hand wheel to be made of plastic or other suitable non-metallic or inexpensive material, and the bushing can be made of bronze or other suitable metal which may be of self-lubricating type, that will not corrode and will ensure free sliding movement of the drive pin in its guide. Each bushing may be secured in the hand wheel, as by a screw 30 screwed into a radial hole in the hub of the wheel and projecting into a registering hole in the bushing and, as shown, the reduced inner end of the screw projects into an elongated longitudinal slot in the adjacent side of the drive pin, thus holding the drive pin from turning in its guide while permitting in and out movements of the pin sufficient to engage it with and disengage it from one of the notches of the spindle pulley. 30a represents a lock screw to hold the screw 30 against turning.

In the construction shown, each drive pin is normally urged inwardly into and held in driving engagement with a notch of spindle pulley 14 by a spring-actuated detent or member 31 which is movable endwise in a radial hole in the hub of the hand wheel and is pressed, as by a coil spring in the hole, against a sloping face 33 of a notch in the adjacent side of the drive pin. This face is sloped in such direction that the pressure of the detent thereon by its spring, acts to cam the drive pin into and hold it in engagement with a notch in the spindle pulley. When it is desired to uncouple the spindle from its driving pulley or wheel 14, the driving pin or pins are pulled outwardly out of engagement with the pulley. In thus disengaging the pin from the pulley, the cam face 33 of each pin will ride over the inner end of its detent, and when the driving pin is clear of the pulley, the pressure of the detent by its spring against the side of the driving pin will releasably retain the pin in this released or uncoupled position. Each drive pin is shown as formed at its outer end with an annular groove 34 in which a tool or implement can be engaged for pulling the pin to its outer uncoupling position, the outer end of the guide bushing or hole for the drive pin being suitably countersunk or socketed at 35 to enable insertion of the tool into the groove of the pin. Other means for forming a driving connection between the pulley 14 and the spindle may be provided, if desired.

Normally, the drive pins will be held in a position in which they couple the hand wheel to the driven spindle pulley for driving the spindle, but if it is desired to free the spindle from its pulley for any reason, as for turning the spindle by hand to properly center or balance the work on the lathe check or spindle face plate, the spindle can be uncoupled simply by pulling the drive pins outwardly until disengaged from the spindle pulley wheel, and the pins will be retained in this position and leave the spindle free until it is desired to again couple the spindle to its pulley or wheel, which is done simply by pushing the drive pins to their inner coupling position.

40 represents an annular opening in the headstock through which the pulley 14 and its bearing bracket are accessible when the hand wheel 24 is removed from the spindle, so that the pulley and its bearing bracket may be removed or replaced without disturbing the spindle bearings. 41 represents the usual draw spindle head.

The construction described has the advantage that it makes possible a complete disconnection of the spindle from its drive mechanism, so that the spindle can turn with a minimum of friction, which is important when balancing or centering work on the spindle or on a face plate (not shown) secured on the spindle. It is frequently necessary for an operator to turn the work on the spindle into different positions, and this can be much more readily done when the spindle is disconnected from its driving mechanism.

In the operation of the lathe described, it will be obvious that the pull of the belt or belts on the spindle pulley will not be transmitted to the spindle, so that the spindle will not be subject to any distortion due to such pull. The spindle pulley thus transmits to the hand wheel and the spindle only torque for turning the spindle, so that imperfections in the work due to distortions of the spindle are avoided.

The structure shown has the further advantage that the pulley is located near the end of the headstock, so that by removing the hand wheel, the pulley is readily accessible for removing and replacing the belts through the opening 40.

I claim as my invention:

1. In a lathe having a headstock provided with spindle bearings, a live spindle rotatably supported by said bearings, and drive means for the spindle including a driven wheel coupled to the spindle to turn the same and located in a position accessible from the outer end portion of the headstock, the improved construction comprising a tubular bearing support which surrounds the spindle out of bearing contact therewith and is fixed on the headstock, an annular bearing with rolling bearing elements surrounding said bearing support and on which said wheel is rotatably mounted, a clamping ring screwed into an axial recess in one end of said wheel, and a packing retained in said recess between said ring and the adjacent end of said bearing.

2. In a lathe having a headstock, and a live spindle rotatably supported by bearings located in the headstock between the work-supporting inner end of the spindle and its opposite outer end, the improved construction comprising spindle driving means including a driven wheel surrounding said outer end portion of the spindle outwardly beyond said spindle bearings and coupled to the spindle to turn the same by coupling means also located outwardly beyond said spindle bearings and accessible for actuation at the adjacent outer end of the headstock, a tubular bearing support which surrounds the spindle out of bearing contact therewith and is fixed at its end which is nearest said inner end of the spindle on a part of the headstock that is located between said driven wheel and said inner end of the spindle, said wheel being rotatably mounted on and directly supported by said bearing support independently of the spindle, whereby driving thrust on said wheel is borne by said bearing support and the spindle is relieved thereof and said wheel is accessible for removal or changing the lathe speed from the outer end portion of the headstock without disturbing said spindle bearings, the spindle or parts at its inner work-supporting end, a hand wheel secured on said outer end portion of the spindle at the outer end of said driven wheel, and said coupling means for causing the spindle to turn with said driven wheel comprising a drive pin which passes lengthwise through said hand wheel parallel with its axis, and is movable lengthwise into and out of coupling engagement with said driven wheel, and a spring-actuated detent which is moved by its spring in a direction at an angle to the direction of movement of said drive pin and by engagement with a cam face on the drive pin normally cams the drive pin into coupling engagement with said driven wheel, and which also is held by its spring against the drive pin and releasably holds the latter in uncoupling position when the drive pin is moved to that position.

DOUGLAS G. ANDERSON.

REFERENCES CITED

The following references are of record in the file of this patent:

UNITED STATES PATENTS

| Number | Name | Date |
| --- | --- | --- |
| 2,278,264 | Hollengreen et al. | Mar. 31, 1942 |
| 919,986 | Whitney | Apr. 27, 1909 |
| 280,867 | Sawyer | July 10, 1883 |
| 1,115,972 | Potter | Nov. 3, 1914 |
| 2,225,950 | Blanchard | Dec. 24, 1940 |
| 1,938,906 | Hoelscher | Dec. 12, 1933 |
| 1,488,232 | Dalton | Mar. 25, 1924 |